United States Patent
Apker et al.

(10) Patent No.: US 10,371,822 B2
(45) Date of Patent: Aug. 6, 2019

(54) ANTENNA ARRAY CALIBRATION

(71) Applicant: Lockheed Martin Corporation, Bethesda, MD (US)

(72) Inventors: Charles Apker, Owego, NY (US); Mark Bullock, Owego, NY (US); Steven Pratt, Owego, NY (US); David D. Schmidt, Owego, NY (US); Matthew Stafford, Owego, NY (US); Scott O. Sorber, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1056 days.

(21) Appl. No.: 13/772,586

(22) Filed: Feb. 21, 2013

(65) Prior Publication Data
US 2014/0232596 A1    Aug. 21, 2014

(51) Int. Cl.
*G01S 19/23* (2010.01)
*H01Q 3/26* (2006.01)

(52) U.S. Cl.
CPC ........... *G01S 19/23* (2013.01); *G01S 19/235* (2013.01); *H01Q 3/267* (2013.01)

(58) Field of Classification Search
CPC ........ H01Q 3/267; G01S 19/23; G01S 19/235
See application file for complete search history.

(56) References Cited

U.S. PATENT DOCUMENTS

| | | | |
|---|---|---|---|
| 4,998,112 A * | 3/1991 | Franchi | H01Q 3/267 342/360 |
| 5,952,968 A | 9/1999 | McDowell | |
| 6,058,318 A * | 5/2000 | Kobayakawa | H01Q 3/267 375/226 |
| 6,421,000 B1 | 7/2002 | McDowell | |
| 7,009,557 B2 | 3/2006 | Kirchofer et al. | |
| 7,304,605 B2 * | 12/2007 | Wells | G01S 19/23 342/357.62 |
| 8,044,857 B2 | 10/2011 | Maenpa et al. | |
| 8,089,402 B2 | 1/2012 | Maenpa et al. | |
| 8,232,918 B2 | 7/2012 | Chang | |

(Continued)

OTHER PUBLICATIONS

L.L. Liou et al., Phase calibration of a 2 by 2 phased array GPS antenna, IEEE Antennas and Propagation Society International Symposium, p. 216-219, Jun. 2002.*

(Continued)

*Primary Examiner* — Bernarr E Gregory
*Assistant Examiner* — Fred H Mull
(74) *Attorney, Agent, or Firm* — Wolf, Greenfield & Sacks, P.C.

(57) ABSTRACT

An apparatus for performing calibration of an antenna array having a plurality of antennas including at least a first antenna and a second antenna. The apparatus includes a global navigation satellite system receiver configured to measure a first phase of a first signal received by the first antenna from a satellite and a second phase of a second signal received by the second antenna from the satellite. The apparatus also includes at least one processor configured to receive the first phase and the second phase from the global navigation satellite system receiver and to operate in a calibration mode to determine a difference between the first and second phases.

24 Claims, 5 Drawing Sheets

(56) References Cited

U.S. PATENT DOCUMENTS

| | | | |
|---|---|---|---|
| 2012/0319902 A1* | 12/2012 | Floch | G01S 19/22 |
| | | | 342/373 |
| 2013/0016003 A1* | 1/2013 | Stirling-Gallacher | H01Q 3/26 |
| | | | 342/174 |
| 2013/0106654 A1* | 5/2013 | Calmettes | H01Q 3/267 |
| | | | 342/357.62 |

OTHER PUBLICATIONS

A.T. Bataei et al., Phase calibration and attitude determination of a 2 by 2 phased array GNSS antenna, Proc.Int. Symp. GPS/GNSS, p. 983-989, Nov. 2008.*

Malmström, Johan "Robust Navigation with GPS/INS and Adaptive Beamforming," Royal Institute of Technology Department of Signals, Sensors & Systems, Apr. 2003.

* cited by examiner

ANTENNA ARRAY CALIBRATION

DISCUSSION OF RELATED ART

Beamsteering of antenna arrays can be used to send or receive a signal in a desired direction. Beamsteering is typically accomplished by adjusting the phases of the signals sent or received based on a desired radiation pattern.

In practice, the relative phases between different antennas of the array may be different than would be expected based on the geometry of the array and wavelength of the signal. Such phase variations can be produced during manufacturing or installation, or may occur over time due to aging of the system, changes in temperature, or other variables.

A conventional technique for calibrating an antenna array involves placing the antenna array in a specially-designed chamber, making measurements of the array, storing phase measurements so the antenna electronics or other host system can use those measurements to compensate for deviations. Antenna arrays are typically calibrated prior to platform installation. This approach provides a good characterization of the stand-alone array performance, but there are three drawbacks associated with this technique:

1) Data Management: The calibration data associated with the array needs to be stored and provided to the portion of its host system that uses this data to accurately steer the array. Configuration management is a challenge, especially if antenna arrays and/or associated antenna electronics are likely to be moved from one platform to another.
2) Installation Effects: When an antenna array is installed on a platform (aircraft, ship, vehicle, munitions etc.), the skin of that platform is merged with the existing array ground plane and the antenna element receive and transmit characteristics are altered. The data taken in the controlled chamber does not account for this, and there are very few chambers in the world that can accommodate an aircraft and accurately measure antenna patterns.
3) Aging Effects: Over time, the components of the antenna array, cabling, and steering electronics will age and undergo changes in their associated phase and gain characteristics.

Alternatively, tight specification of antenna array phase performance and cabling with correspondingly tight manufacturing tolerances and acceptance testing may eliminate the need for collecting calibration data in a chamber for each antenna array. This will eliminate the data management challenge of matching installed arrays with their calibration data, but the tight specifications increase the cost of producing the arrays and does not address installation effects or aging effects.

SUMMARY

Some embodiments relate to an apparatus for performing calibration of an antenna array having a plurality of antennas including at least a first antenna and a second antenna. The apparatus includes a global navigation satellite system receiver configured to measure a first phase of a first signal received by the first antenna from a satellite and a second phase of a second signal received by the second antenna from the satellite. The apparatus also includes at least one processor configured to receive the first phase and the second phase from the global navigation satellite system receiver and to operate in a calibration mode to determine a difference between the first and second phases.

Some embodiments relate to a calibration method for an antenna array having a plurality of antennas including at least a first antenna and a second antenna. The method includes measuring a first phase of a first signal received by the first antenna and a second phase of a second signal received by the second antenna using a global navigation satellite system receiver. The first and second signals are received from a satellite. The method also includes determining a difference between the first and second phases. The method further includes comparing the difference between the first and second phases with an expected phase difference between signals received using the first and second antennas to produce a phase correction value.

Some embodiments relate to a computer readable storage medium for performing the above-described method.

The foregoing summary is provided by way of illustration and is not intended to be limiting.

DETAILED DESCRIPTION

Figure 1:
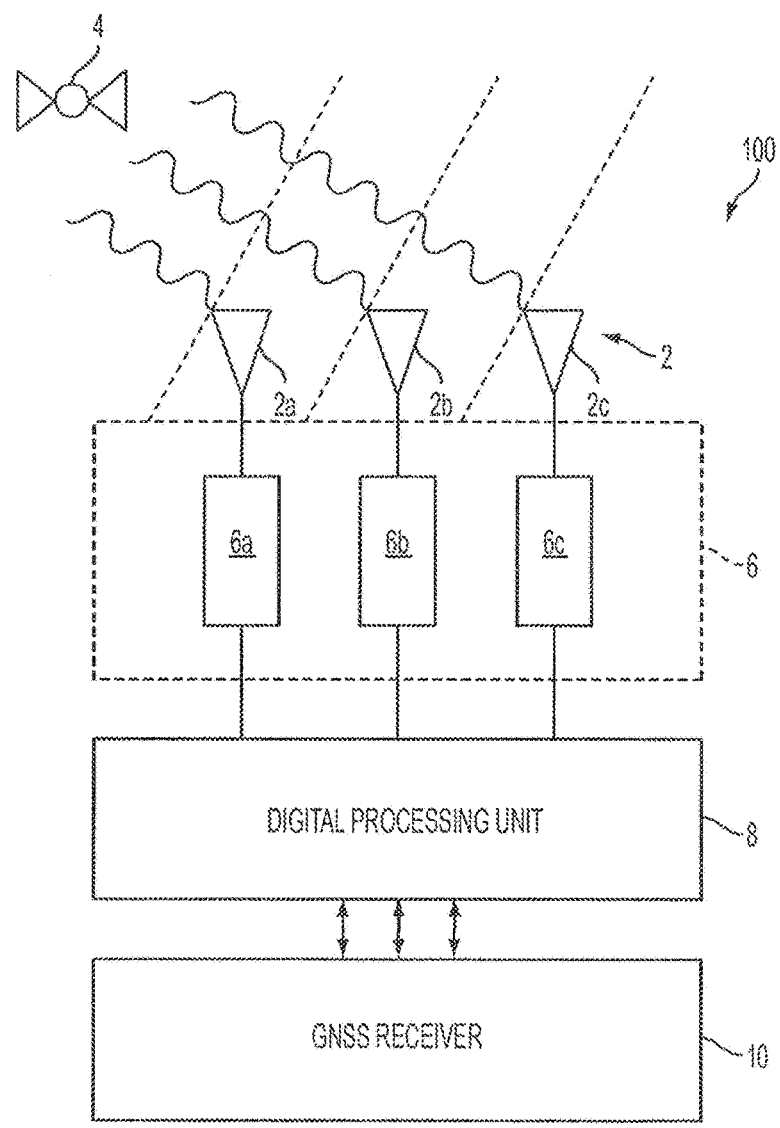
FIG. 1 shows a communication system including an antenna array and at least one processor as well as a GNSS receiver to calibrate reception of signals via the antenna array, according to some embodiments.

FIG. 1 shows an example of a communication system 100, according to some embodiments. Communication system 100 includes an antenna array 2 including a plurality of antennas 2a, 2b, 2c, etc. Although only three antennas are shown in FIG. 1, any suitable number of antennas may be included in the antenna array 2, as the techniques described herein are not limited in this respect. Antennas 2a, 2b, 2c, etc. may be displaced from one another along a first dimension in a linear configuration, as illustrated in FIG. 1. However, the antennas of the antenna array 2 may have any suitable configuration, such as a two-dimensional or three-dimensional array, as the techniques described herein are not limited to a linear antenna array.

The antennas 2a, 2b, 2c, etc. may receive signals from a satellite 4, as schematically illustrated in FIG. 1. In some embodiments, satellite 4 may be a satellite of a Global Navigation Satellite System (GNSS) such as the Global Positioning System (GPS), Galileo or GLONASS, for example. A GNSS is a satellite-based navigation and location system using multiple satellites having orbits designed such that at least four satellites will be visible to a receiver at any given time. A GNSS receiver calculates its own position by measuring signals it receives from satellites. When four satellite locations and the corresponding distances to the receiver are known, the receiver can compute position and time. The receiver is able to measure distance to each of the transmitting satellites and measure the phase of the satellite signals at the receive antenna. A GPS receiver is one example of a GNSS receiver, however, other suitable types of GNSS receivers may be used, such as receivers configured to operate with the Galileo or GLONASS systems, for example.

The signals received by antennas 2a, 2b, and 2c are received and processed by an RF processing unit 6. RF processing unit 6 may have an RF circuit 6a coupled to antenna 2a, an RF circuit 6b coupled to antenna 2b, and an RF circuit 6c coupled to antenna 2c. The RF circuits of RF processing unit 6 may perform a variety of suitable functions such as filtering and downconversion of the received signals. RF processing unit 6 may include one or more analog to digital converters that convert the processed RF signals to digital signals. RF processing unit 6 provides the digital signals to a digital processing unit 8 for further processing.

Digital processing unit 8 may perform any of a variety of processing operations on the received digital signals, such as combining the signals and/or adjusting the received phase of one or more received signals, for example. In some embodiments, digital processing unit 8 may process the received signals in a manner that performs digital beamsteering for the antenna array 2. Different phases can be introduced for signals received via different antennas to align the phases of the received signals. This allows a signal of interest to be combined coherently across the multiple antennas of the antenna array. Beamsteering phase values for different paths can be chosen in a suitable manner, such that, when the signals are summed, a resulting signal is produced in which a signal received from a selected direction has a higher gain. Such a technique can reduce interference and improve jamming immunity of the desired signal. For example, the digital processing unit 8 may programmatically select the respective phases of different reception paths such that the antenna array 2 is effectively steered to primarily receive signals from the direction of satellite 4. Thus, the communication system 100 may use beamsteering techniques to more effectively receive signals from the satellites of a GNSS, thereby reducing interference and reducing the effect of jamming. In some cases, beamsteering may be used to position a null of the antenna reception pattern in the direction from which a jamming signal is received. Techniques for selecting suitable phase values to effectively steer the antenna reception pattern are known and therefore will not be described herein in detail. Any suitable techniques may be used for steering the reception pattern of the antenna array 2.

Figure 2:
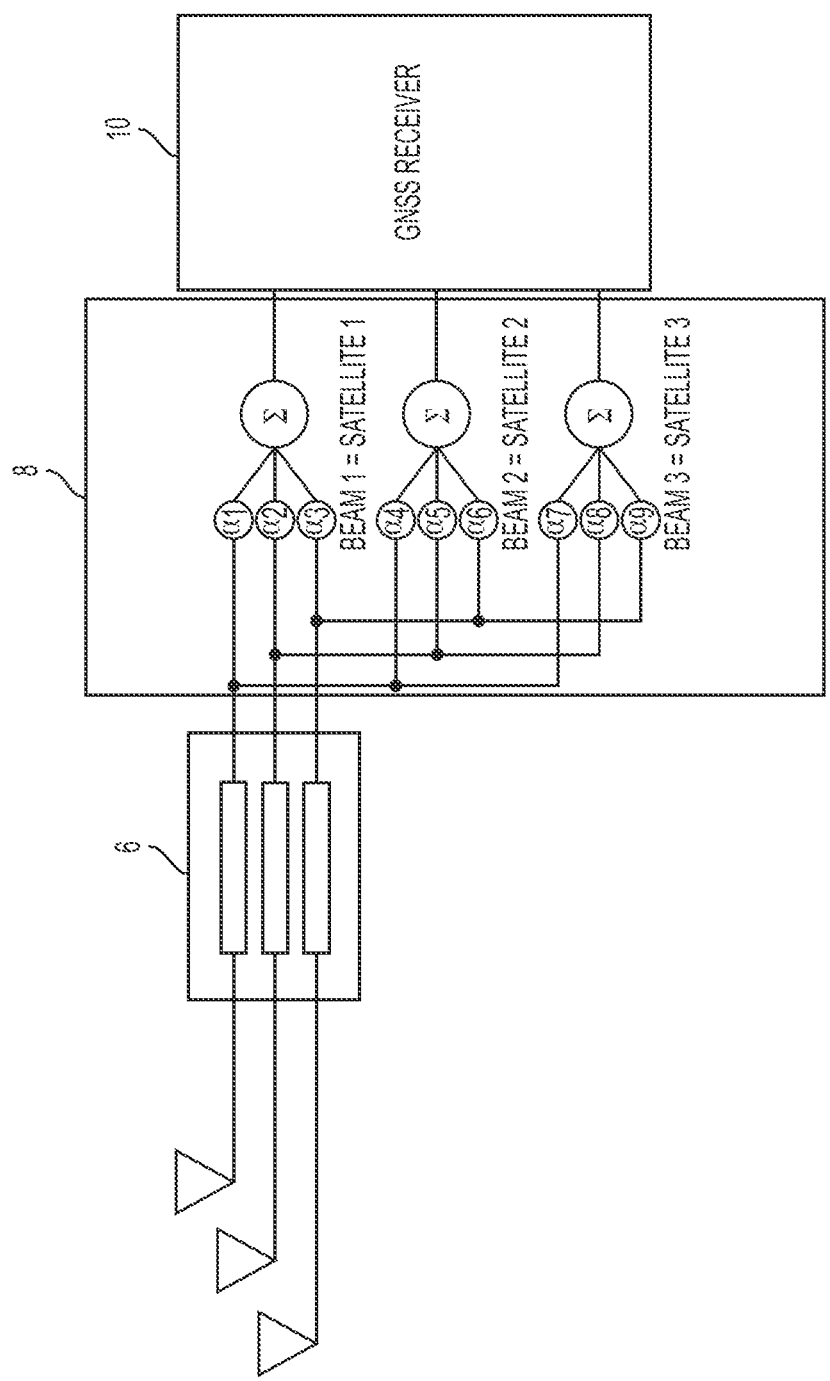
FIG. 2 illustrates the processing that can be performed by the digital processing unit in a beamforming mode.

FIG. 2 schematically illustrates the processing that can be performed by the digital processing unit 8 when the digital processing unit 8 is in a beamforming mode in which processing is performed on the signals received from the antenna array 2 to selectively receive one or more signals from selected direction(s). For example, a first signal "beam 1" corresponding to a first direction may be produced by summing each of the signals with received from each of the antennas of the array with applied respective phases (e.g., $\alpha_1$, $\alpha_2$ and $\alpha_3$). Similarly, a second signal "beam 2" corresponding to a second direction may be produced by summing each of the signals received from each of the antennas of the array with respective phases with applied respective phases (e.g., $\alpha_4$, $\alpha_5$ and $\alpha_6$). A third signal "beam 3" corresponding to a third direction may be produced by summing each of the signals received from each of the antennas of the array with respective phases with applied respective phases (e.g., $\alpha_7$, $\alpha_8$ and $\alpha_9$). The directionality of the beams may be selected to track a plurality of satellites of a global navigation satellite system, for example, or other objects.

The digital signals produced by digital processing unit 8 are sent to GNSS receiver 10 for processing. Digital processing unit 8 and GNSS receiver 10 may communicate with one another using any suitable protocol, such as a serial protocol or a parallel protocol. GNSS receiver 10 can include electronics for processing the digital signal from the satellite 4, as well as signals received from other satellites of the GNSS. As discussed above, the GNSS receiver 10 can process the signals received from multiple satellites and determine the location of the communication system 100 based on these signals. Any suitable circuits, software, or techniques may be used for processing the received signals from the satellites of a GNSS, analyzing the phase of these signals to determine distances to the satellites, and calculating the position of the communication system 100.

In some embodiments, information representing the determined position (e.g., coordinates) of the communication system 100 may be sent from GNSS receiver 10 to digital processing unit 8. Digital processing unit 8 may use the determined position of the communication system 100 to steer the reception pattern of the antenna array 2. Given the position and orientation of the communication system 100 and the known location of the satellite 4, a suitable angle can be selected at which to steer the reception pattern towards satellite 4.

As discussed above, the relative phasing of the paths from the antennas of antenna array 2 may be different than expected due to manufacturing variations, changes in temperature, or aging of the system. For example, the phases of the signals received from antennas 2a and 2b may be expected to differ based on the difference in their respective positions, as well as the angle of arrival and the wavelength of the received signal. As an example, the signal received by antenna 2b from satellite 4 would be expected to be delayed with respect to the signal received by antenna 2a because antenna 2b is located farther from the satellite 4 than antenna 2a. Accordingly, the wavefront takes longer to reach antenna 2b than it does to reach antenna 2a, as illustrated in FIG. 1. This difference in phase can be calculated based on the positions of the antennas, their orientation, the position of the satellite 4, and the wavelength of the signal. However, in addition to the expected difference in phase caused by the differences in the positions of the antennas, the signals from antenna 2a and 2b may be caused to have additional phase shifts relative to one another due to any differences in propagation time through the RF processing unit 6 or cabling from the antennas 2. For example, RF circuits 6a and 6b may introduce different phase changes due to variations in the manufacturing of RF circuits 6a and 6b, or due to changes over time that affect these circuits in different ways. When the relative phases of the signals become different from what is expected, the effectiveness of beamsteering is reduced. For example, when digital processing unit 8 changes the phase of different paths to perform beamsteering, the phases that result are different than desired, and when the resulting signal is summed, the resulting signal may not be as directional as desired, and/or may not track the satellite 4 as effectively.

In some embodiments, digital processing unit 8 can perform processing to calibrate the communication system 100 to reduce or eliminate the differences in phase from signals received at different antennas of the array 2 that are caused by differences in manufacture, temperature, and/or aging of the array, for example. Digital processing unit 8 operates in cooperation with GNSS receiver 10 to determine calibration information regarding corrections in phase to be applied to one or more received signals. As discussed above, GNSS receiver 10 is configured to measure the phase of a signal received from a satellite (e.g., satellite 4). In some embodiments, GNSS receiver 10 is configured to provide the raw phase information to digital processing unit 8 for use in calculating deviations in phase from expected values, enabling the digital processing unit 8 to calculate phase corrections.

Figure 3:
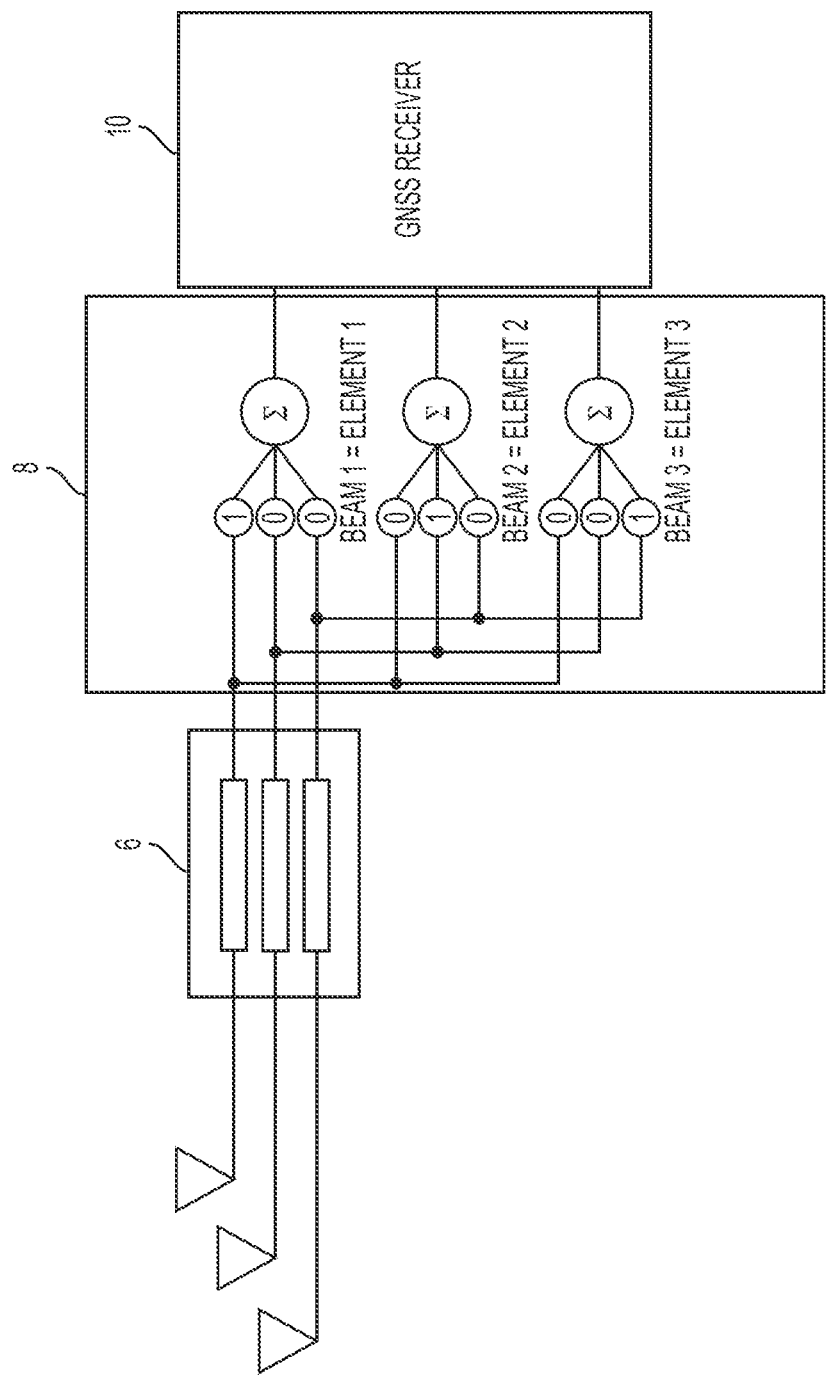
FIG. 3 illustrates the processing that can be performed by the digital processing unit in a calibration mode.

FIG. 3 schematically illustrates the processing that can be performed by the digital processing unit 8 when the digital processing unit 8 is in a calibration mode in which variations in phases of signals received via different antennas of the array can be measured and corrected. When the digital processing unit 8 is in the calibration mode, signals received from a common satellite may be used to compare the phases of signals received via different antennas of the array. As illustrated in FIG. 3, a first signal "beam 1" may be produced that corresponds to a signal received from a first antenna of the array, a second signal "beam 2" may be produced that corresponds to signal received from a second antenna of the array, and a third signal "beam 3" may be produced that corresponds to signal received from a third antenna of the array. Each of the signals from the respective antennas of the array are provided to the GNSS receiver 10 to measure their respective phases. GNSS receiver 10 has a plurality of logically separate inputs allowing the GNSS receiver to receive signals from different elements of the array at the same time.

Figure 4:
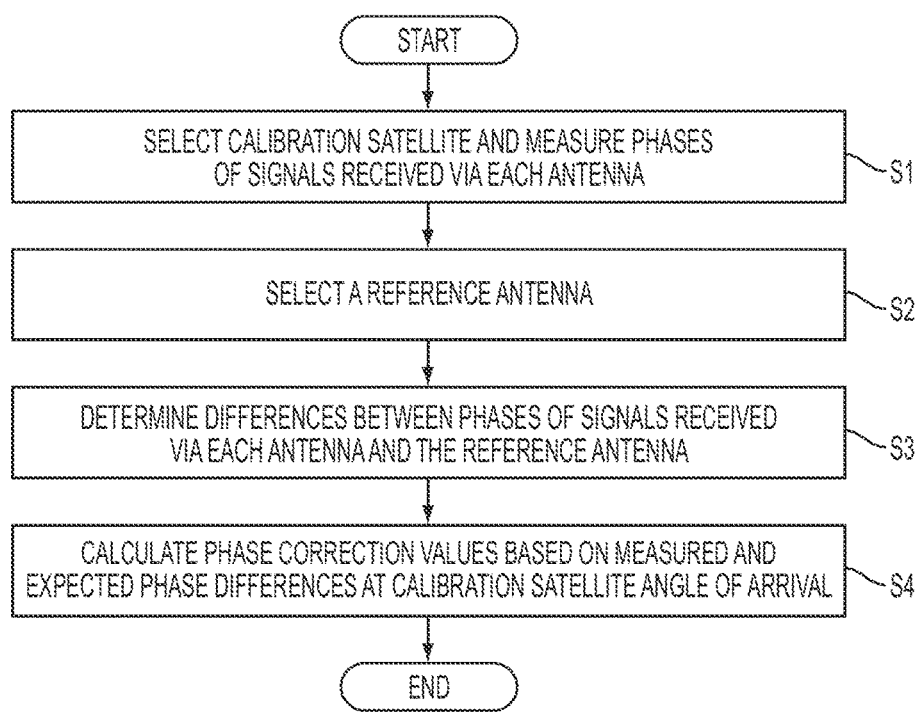
FIG. 4 shows a flowchart illustrating a calibration method, according to some embodiments.

FIG. 4 shows a method of calibration that may be performed by digital processing unit 8 in cooperation with GNSS receiver 10, in accordance with some embodiments.

In step S1, a calibration satellite is selected and the phase of the signals received via the individual antennas 2 of the array can be measured. In some embodiments, the phases of the signals received via antennas 2a, 2b and 2c are determined at the same time. Determining the phases of all of the signals at the same time may simplify calculations by reducing or eliminating a need to compensate for movement of the satellite 4 while measurements are made. However, in some embodiments, phase measurements for one or more antennas may be made at different times, and a suitable correction may be determined based on movement of the satellite 4 during the period between measurements. The phases of at least two signals can be made at the same time to provide a suitable basis of comparison between the at least two signals being compared.

To measure the phase of the signals received via antenna 2a, 2b, and 2c, digital processing unit 8 may control GNSS receiver 10 to measure the phases of signals received from satellite 4 using antenna 2a, 2b and 2c, respectively. GNSS receiver 10 measures this phase information and sends the phase information for each antenna to digital processing unit 8. Digital processing unit 8 may then store the received phase information for each antenna.

In step S2, digital processing unit 8 may select a first antenna of the antenna array 2 for use as a phase reference. Any antenna of the array 2 may be selected as a basis for comparison with other antennas in the array. For example, antenna 2a may be selected as a reference antenna.

In step S3, digital processing unit 8 may determine the difference between the measured phases for each antenna and the phase measured for the reference antenna. For example, if antenna 2a is selected as a reference antenna, the difference in phase between signals received via antennas 2a and 2b may be calculated by subtracting the phase value $\varphi_a$ measured for antenna 2a from the phase value $\varphi_b$ measured for antenna 2b to produce a measured difference in phase $\varphi_{ab,\ meas}$ between the signal paths coupled to antennas 2a and 2b. The measured difference in phase $\varphi_{ab,\ meas}$ may be stored by the digital processing unit 8. Similarly, the difference in phase between signals received via antennas 2a and 2c may be calculated by subtracting the phase value $\varphi_a$ measured for antenna 2a from the phase value $\varphi_c$ measured for antenna 2c to produce a measured difference in phase $\varphi_{ac,\ meas}$ between the signal paths coupled to antennas 2a and 2c. The measured difference in phase $\varphi_{ac,\ meas}$ may be stored by the digital processing unit 8. Differences in phase between signals received via each antenna of the array and a selected reference antenna may thereby be determined.

In step S4, the measured differences in phase can be compared with expected phase differences for each antenna (with respect to the reference antenna) to calculate phase correction values.

Digital processing unit 8 may store a table of expected phase differences between respective antennas of the array, $\varphi_{ab,\ exp}$, $\varphi_{ac,\ exp}$, etc. The expected phase difference between signals received via antennas 2a and 2b is termed $\varphi_{ab,\ exp}$. The expected phase difference between signals received via antennas 2a and 2c is termed $\varphi_{ac,\ exp}$. The values of the expected phase differences may be calculated based on the geometry of the antenna array, the position of the satellite and/or the wavelength of the received signal, for example, as discussed above. These expected values may be calculated and stored by the digital processing unit 8 during manufacturing of the communication system 100, for example.

Phase correction values may be calculated by subtracting the expected phase difference between the measured phase difference for each pair of paths. For example, the phase correction value $\varphi_{ab,\ corr}$ may be calculated by subtracting the expected phase difference $\varphi_{ab,\ exp}$ from the measured phase difference $\varphi_{ab,\ meas}$. Similarly, the phase correction value $\varphi_{ac,\ corr}$ may be calculated by subtracting the expected phase difference $\varphi_{ac,\ exp}$ from the measured phase difference $\varphi_{ac,\ meas}$. The digital processing unit 8 may store the phase correction values $\varphi_{ab,\ corr}$ and $\varphi_{ac,\ corr}$.

When the antenna array 2 includes additional antennas, additional measurements and calculations as described above may be performed with respect to each additional antenna. Accordingly, digital processing unit 8 can generate and store a table of differences in phase and/or correction values. This information can be used by digital processing unit 8 to improve beamsteering. For example, when the correction values determined by the digital processing unit 8 can be applied when determining the phase to be applied to different signals. For example, the determined correction values may be added to the phase adjustment used in beamsteering. Thus, communication system 100 can perform self-calibration to correct for deviations in the relative phasing of the signal paths from different antennas. Such a self-calibration technique may be performed at suitable intervals over the lifespan of the communication system 100 to improve its performance.

In some embodiments, correction values may be determined based on a single angle of arrival. Such correction values may be used for calibrating the antenna array for the reception of signals from any angle of arrival. However, in some embodiments, the digital processing unit 8 may produce phase correction values that compensate for angle of arrival (e.g., based on azimuth and/or elevation). Such a technique may be particularly useful when the array is used on a platform (e.g., aircraft, ship, vehicle, munitions etc.), that affects the phase of electromagnetic waves differently depending of the angle of arrival.

Figure 5:
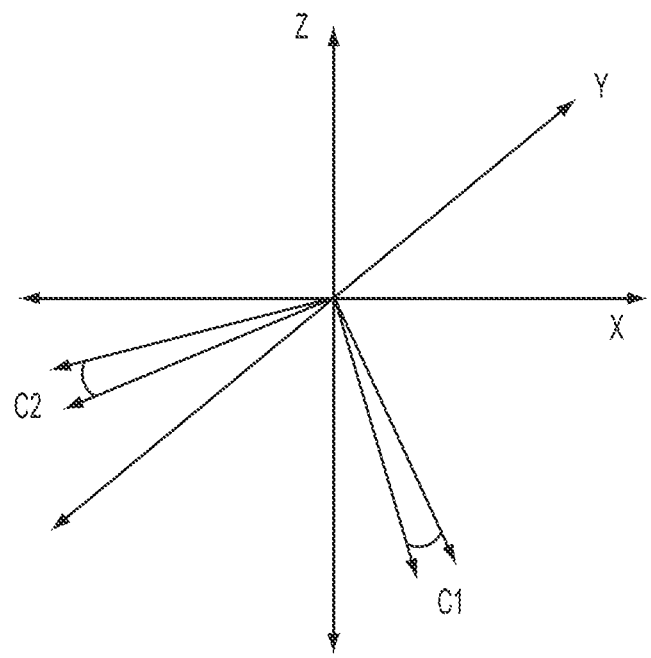
FIG. 5 illustrates that different correction values may be determined for different angles of arrival.

As illustrated in FIG. 5, different correction values may be determined for different angles of arrival. For example, a first set of correction values C1 may be determined for angles of arrival located on a first side of the array, and a second set of correction values C2 may be determined for angles of arrival on a second side of the array. As another example with higher granularity, correction values may be determined for angles of arrival in each quadrant. As another example, unique correction values may be determined for each degree of azimuth and elevation. Any suitable granularity of correction values based on angle of arrival may be determined.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

For example, embodiments of controllers, such as a controller for implementing digital processing unit 8 may be implemented using hardware, software or a combination thereof. When implemented in software, the software code can be executed on any suitable hardware processor or collection of hardware processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed to perform the functions recited above.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over to dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. An apparatus for performing calibration of an antenna array having a plurality of antennas including at least a first antenna and a second antenna, the apparatus comprising:
    at least one computer readable medium;
    a global navigation satellite system receiver configured to measure phases of signals received by the global navigation satellite system receiver; and
    at least one processor configured to:
        receive signals from the plurality of antennas;
        operate in a calibration mode to determine a phase correction based on signals received from a calibration satellite by:
            selecting a first signal received by the first antenna from the calibration satellite from amongst signals received from the plurality of antennas;
            selecting a second signal received by the second antenna from the calibration satellite from amongst the signals received from the plurality of antennas;
            in response to providing the first signal and the second signal to the global navigation satellite system receiver and the global navigation satellite system receiver measuring the phases of the first signal and the second signal as a first phase and a second phase, respectively, receiving the first phase and the second phase from the global navigation satellite system receiver;
            determining a difference between the first and second phases;
            obtaining, from the at least one computer readable medium, an expected phase difference between signals received by the first and second antennas; and
            determining the phase correction by comparing the expected phase difference with the determined difference between the first and second phases; and
        operate in a beamforming mode by:
            producing a plurality of beamformed signals, each beamformed signal being produced for a respective satellite of a plurality of satellites by phase-adjusting and combining the signals received from the plurality of antennas, wherein said phase-adjusting is performed based at least in part on the determined phase correction.

2. The apparatus of claim 1, wherein the at least one processor is configured to determine the phase correction by performing subtraction to obtain a difference between the expected phase difference and the determined difference between the first and second phases.

3. The apparatus of claim 1, wherein the at least one processor is further configured to determine different phase correction values for different angles of arrival.

4. The apparatus of claim 1, wherein the at least one processor is configured to provide the first signal and the second signal to the global navigation satellite system receiver.

5. The apparatus of claim 1, wherein the plurality of satellites are satellites of a global navigation satellite system and wherein the at least one processor is further configured to track the plurality of satellites when operating in the beamforming mode.

6. The apparatus of claim 1, wherein the plurality of antennas further comprises a third antenna, wherein the at least one processor is further configured to determine a third phase of a third signal received by the third antenna from the calibration satellite, the at least one processor being further configured to determine a difference between the first and third phases.

7. The apparatus of claim 6, wherein the at least one processor is further configured to compare the difference between the first and third phases with an expected phase difference between signals received using the first and third antennas to produce a phase correction value.

8. The apparatus of claim 1, wherein the at least one processor is further configured to, when operating in the beamforming mode:
    adjust a phase of a signal received by the first antenna from a first global navigation satellite to produce a first phase-adjusted signal;

adjust a phase of a signal received by the second antenna from the first global navigation satellite to produce a second phase-adjusted signal;

sum the first phase-adjusted signal and the second phase-adjusted signal to produce a first beamformed signal;

adjust a phase of a signal received by the first antenna from a second global navigation satellite to produce a third phase-adjusted signal;

adjust a phase of a signal received by the second antenna from the second global navigation satellite to produce a fourth phase-adjusted signal;

sum the third phase-adjusted signal and the fourth phase-adjusted signal to produce a second beamformed signal; and provide the first beamformed signal and the second beamformed signal to the global navigation satellite system receiver.

9. The apparatus of claim 1,
wherein the global navigation satellite system receiver comprises a plurality of logically separate inputs that include a first input and a second input, and
wherein the global navigation satellite system receiver is configured to, at the same time:
receive the first signal from the first antenna at the first input; and
receive the second signal from the second antenna.

10. A calibration method for an antenna array having a plurality of antennas including at least a first antenna and a second antenna, the method comprising:
selecting, using at least one processor, a first signal received by the first antenna from a calibration satellite from amongst signals received from the plurality of antennas;
selecting, using the at least one processor, a second signal received by the second antenna from the calibration satellite from amongst the signals received from the plurality of antennas;
measuring a first phase of the first signal received by the first antenna and a second phase of the second signal received by the second antenna using a global navigation satellite system receiver;
receiving, by the at least one processor, the first phase and the second phase from the global navigation system receiver;
determining, using the at least one processor, a difference between the first and second phases;
obtaining, from at least one computer readable medium, an expected phase difference between signals received by the first and second antennas;
determining, using the at least one processor, a phase correction by comparing the difference between the first and second phases with the expected phase difference; and
producing, using the at least one processor, a plurality of beamformed signals, each beamformed signal being produced for a respective satellite of a plurality of satellites by phase-adjusting and combining the signals received from the plurality of antennas, wherein said phase-adjusting is performed based at least in part on the determined phase correction.

11. The calibration method of claim 10, wherein the calibration satellite is a satellite of a global navigation satellite system.

12. The calibration method of claim 10, further comprising:
storing the expected phase difference and the phase correction value in the at least one computer readable medium.

13. The calibration method of claim 10, further comprising:
calculating beamsteering phase values for the first and second signals, based at least in part on the phase correction value, to receive an electromagnetic wave from a selected direction.

14. The calibration method of claim 10, wherein the plurality of antennas further comprises a third antenna, and the method further comprises:
determining a third phase of a third signal received by the third antenna from the calibration satellite;
determining a difference between the first and third phases; and
comparing the difference between the first and third phases with a second expected phase difference between signals received using the first and third antennas to produce a second phase correction value.

15. A non-transitory computer readable storage medium having stored thereon instructions, which, when executed by at least one processor, perform a calibration method for an antenna array having a plurality of antennas including at least a first antenna and a second antenna, the method comprising:
selecting, using the at least one processor, a first signal received by the first antenna from a calibration satellite from amongst signals received from the plurality of antennas;
selecting, using the at least one processor, a second signal received by the second antenna from the calibration satellite from amongst the signals received from the plurality of antennas;
in response to providing the first signal and the second signal to a global navigation satellite system receiver and the global navigation satellite system receiver measuring the phases of the first signal and the second signal as a first phase and a second phase, respectively, receiving the first phase and the second phase from the global navigation satellite system receiver;
determining, using the at least one processor, a difference between the first and second phases;
obtaining, from at least one computer readable medium, an expected phase difference between signals received by the first and second antennas;
determining, using the at least one processor, a phase correction by comparing the difference between the first and second phases with the expected phase difference; and
producing, using the at least one processor, a plurality of beamformed signals, each beamformed signal being produced for a respective satellite of a plurality of satellites by phase-adjusting and combining the signals received from the plurality of antennas, wherein said phase-adjusting is performed based at least in part on the determined phase correction.

16. The non-transitory computer readable storage medium of claim 15, wherein the calibration satellite is a satellite of a global navigation satellite system.

17. The non-transitory computer readable storage medium method of claim 15, wherein the method further comprises storing the expected phase difference and the phase correction value in the at least one computer readable medium.

18. The non-transitory computer readable storage medium method of claim 15, wherein the method further comprises calculating beamsteering phase values for the first and second signals, based at least in part on the phase correction value, to receive an electromagnetic wave from a selected direction.

19. The non-transitory computer readable storage medium method of claim 15, wherein the plurality of antennas further comprises a third antenna, and the method further comprises:
   determining a third phase of a third signal received by the third antenna from the calibration satellite;
   determining a difference between the first and third phases; and
   comparing the difference between the first and third phases with a second expected phase difference between signals received using the first and third antennas to produce a second phase correction value.

20. An apparatus for performing calibration of an antenna array having a plurality of antennas including at least a first antenna and a second antenna, the apparatus comprising:
   at least one computer readable medium;
   a global navigation satellite system receiver configured to measure a first phase of a first signal received by the first antenna from a satellite and a second phase of a second signal received by the second antenna from the satellite; and
   at least one processor configured to:
      receive the first phase and the second phase from the global navigation satellite system receiver;
      determine a difference between the first and second phases;
      obtain, from the at least one computer readable medium, an expected phase difference between signals received by the first and second antennas;
      determine a phase correction by comparing the expected phase difference with the determined difference between the first and second phases; and
      perform beamsteering of the first signal received by the first antenna from the satellite and of the second signal received by the second antenna from the satellite by adjusting the first phase of the first signal and the second phase of the second signal based at least in part on the determined phase correction.

21. The apparatus of claim 20, wherein the at least one processor is configured to determine the phase correction by performing subtraction to obtain a difference between the expected phase difference and the determined difference between the first and second phases.

22. The apparatus of claim 20, wherein the at least one processor is configured to obtain the first and second signals and to provide the first signal and the second signal to the global navigation satellite system receiver.

23. The apparatus of claim 20, wherein the at least one processor is further configured to track a plurality of satellites of a global navigation satellite system during said beamsteering.

24. The apparatus of claim 20, wherein the at least one processor is further configured to compare the difference between the first and third phases with an expected phase difference between signals received using the first and third antennas to produce a phase correction value.

* * * * *